(12) United States Patent
Rojas Gallego et al.

(10) Patent No.: US 9,061,767 B2
(45) Date of Patent: Jun. 23, 2015

(54) VIBRATIONS REDUCTION DEVICE IN THE CHAIRS OF HELICOPTER PILOTS

(75) Inventors: Camilo Rojas Gallego, Bogota (CO); Jonathan Maya Tellez, Bogota (CO)

(73) Assignee: La Nacion, Ministerio de Defensa (CO)

( * ) Notice: Subject to any disclaimer, the term of this patent is extended or adjusted under 35 U.S.C. 154(b) by 539 days.

(21) Appl. No.: 13/510,834

(22) PCT Filed: Nov. 20, 2009

(86) PCT No.: PCT/IB2009/055244
§ 371 (c)(1),
(2), (4) Date: Sep. 4, 2012

(87) PCT Pub. No.: WO2011/061567
PCT Pub. Date: May 26, 2011

(65) Prior Publication Data
US 2012/0318920 A1 Dec. 20, 2012

(51) Int. Cl.
*B60N 2/00* (2006.01)
*B64D 11/06* (2006.01)
*B60N 2/42* (2006.01)
*B60N 2/427* (2006.01)
*B60N 2/50* (2006.01)
*B60N 2/52* (2006.01)

(52) U.S. Cl.
CPC .......... *B64D 11/0696* (2013.01); *B60N 2/4242* (2013.01); *B60N 2/42736* (2013.01); *B60N 2/501* (2013.01); *B60N 2/504* (2013.01); *B60N 2/525* (2013.01); *B64D 11/0689* (2013.01); *Y02T 50/46* (2013.01); *B64D 11/0619* (2014.12)

(58) Field of Classification Search
CPC .......... B64D 11/0696; B64D 11/0619; B64D 11/0689; B60N 2/4242; B60N 2/525; B60N 2/506; B60N 2/42736; B60N 2/051
USPC ......... 248/638, 559, 562, 563–566, 573, 575, 248/581, 584, 588, 591, 631, 550, 618, 248/669; 244/122 R; 297/216.16, 216.17, 297/216.19, 216.2, 303.2, 344.16, 344.19; 267/140.11, 136; 296/68.1, 65.02
See application file for complete search history.

(56) References Cited

U.S. PATENT DOCUMENTS 3,100,101 A * 8/1963 Trevaskis ...................... 248/550
3,150,855 A    9/1964 Carter
3,682,431 A * 8/1972 Vivian .......................... 248/631
(Continued)

FOREIGN PATENT DOCUMENTS

| EP | 0 059 870 | 9/1982 |
| EP | 0 938 999 | 9/1999 |

(Continued)

*Primary Examiner* — Christopher Garft
(74) *Attorney, Agent, or Firm* — Merchant & Gould P.C.

(57) ABSTRACT

The present invention refers to a device to reduce the vibrations that are produced in the chairs of helicopter pilots due to the movement of the blades of such aircraft. Such device is based on a low weight and cost pneumatic system, that counteracts the vibrations suffered by the pilot, as it neutralizes the movement of the chair's structure making the vibration to be absorbed by a pneumatic ball and is not transmitted to the pilots body. Additionally, the device counts with a support structure coupled to a security mechanism and anchorage, which rests over the pneumatic bellows and vertically displaces over the security mechanism guides damping and isolating the vibrations produced by the aircraft's rotors.

12 Claims, 13 Drawing Sheets

(56) References Cited

U.S. PATENT DOCUMENTS

| | | | | |
|---|---|---|---|---|
| 4,140,028 | A | * | 2/1979 | Desjardins .................. 74/574.3 |
| 5,294,085 | A | * | 3/1994 | Lloyd et al. .................. 248/562 |
| 5,388,801 | A | * | 2/1995 | Edrich et al. ................ 248/564 |
| 5,771,816 | A | * | 6/1998 | Zaguroli, Jr. ................ 108/147 |
| 6,672,667 | B1 | * | 1/2004 | Park .......................... 297/344.1 |
| 7,543,792 | B1 | * | 6/2009 | Ursel et al. .................. 248/638 |
| 8,424,832 | B2 | * | 4/2013 | Robbins et al. .............. 248/550 |
| 8,757,600 | B2 | * | 6/2014 | Haller ......................... 267/131 |
| 2003/0173725 | A1 | | 9/2003 | Noe |
| 2009/0189407 | A1 | * | 7/2009 | Lewis, II .................... 296/65.02 |

FOREIGN PATENT DOCUMENTS

| | | |
|---|---|---|
| EP | 1 392 987 | 3/2004 |
| EP | 1 659 309 | 5/2006 |
| JP | 57-178937 | 11/1982 |
| WO | WO 00/35708 | 6/2000 |

* cited by examiner

VIBRATIONS REDUCTION DEVICE IN THE CHAIRS OF HELICOPTER PILOTS

This application is a National Stage Application of PCT/IB2009/055244, filed 29 Nov. 2009 and which application is incorporated herein by reference. To the extent appropriate, a claim of priority is made to the above disclosed application.

TECHNOLOGICAL FIELD

The present invention refers to a device to reduce the vibrations produced on the pilot's chair due to the movement of the blades of such aircraft. During flight, the chairs, the cyclic, the collective, the pedals and the control mechanisms transmit the vibrations directly to the body of the pilot, who experiments endless sensations that can put in danger the flights security, and that later with time, cause health problems on the pilots, especially of the spine and back, which demands the investment of great quantities of money in physical treatments and in some cases the early retirement of flight personnel.

With the purpose of reducing the vibrations produced by the different elements or components that are in direct contact with the helicopter's pilot, the present invention supplies a device that is based on a low weight and cost pneumatic system, that offset the vibrations suffered by the pilot, all time that it neutralizes the movement of the chassis or of the chair making the vibration to be absorbed by a pneumatic ball and not to be transmitted to the body of the pilot.

BACKGROUND

Helicopters count with a considerable number of vibrations generated by diverse sources, that go from simple vibrations originated by the effect of aerodynamic forces during flight, as are the aeroelastic and aeromechanical instabilities, to greater range ones generated by the motor and the rotor. When analyzing the behaviour of the helicopter, it can be observed that the intensity of the vibrations is greater during the takeoff and the landing.

The effects caused by the vibration are divided in two categories: effects produced by aerodynamic causes and effects produced by mechanical causes. All these effects bring with them impacts of different classes, such as comfort and efficiency of the crew, the fatigue of the dynamic components and the structure of the apparatus or the accuracy and level of efficiency of the electronic equipment.

The helicopter's main rotor produce vibrations in ranges from 3 to 12 Hz and the frequency depend on the number of blades. This range is much lesser to the one produced by the tail's rotor, which induces vibrations between 20 and 25 Hz. The produced vibrations travel through the aircraft's fuselage in the form of low frequency vibrations and adversely affect the helicopter's controls, the operations sub-system and the comfort of the crew, mostly in aircrafts with bi-bladed rotors, like the UH-1H helicopter.

The vibrations can be defined as the oscillatory movements of the particles of the solid bodies around their equilibrium point. Technologically is almost impossible to build a machine that moves energy from one place to another without the operation to be accompanied by vibrations of some kind. As larger are the mobile parts, more possibilities there are that vibrations are produced that are generally accompanied by noise.

The effect of vibration on the human body depends of the amplitude and duration. Due to the relation of possible adverse effects on the human body, low frequency vibrations (ranges of 1-100 Hz) are the most harmful for the crew. When studying the behaviour of vibrations is important to take into account four aspects: magnitude, frequency, direction and duration.

So, one of the greater problems that are presented with the flying of helicopters is that the main rotor as well as the tail's rotor, generate vibrations that are directly transmitted to the flight personnel, especially pilots and co-pilots, all time that the chairs of these crew are joined directly to the beams of the mentioned rotors, which are part of the aircraft's chassis. In this sense, every time that the pilot flights the helicopter, the movement of the blades is going to be transmitted directly to his chair and therefore to his body, which leads to serious health problems in the future.

Due to this type of situation, the aerospace medicine specialized medical centres perform a continuous follow-up to the health and physical integrity of the pilots, making emphasis in the helicopter pilots, who are subjected, in greater extent, to the exposure of harmful vibrations. The main consequences observed in this group of people are generally found reflected in lumbar problems in a 63% and from them a high percentage of cases aggravate with the continuous exposure to the vibrations produced by the aircraft, even causing irreversible damages. In addition to influencing the lumbar zone of the pilot, vibrations also affect visual acuity, motor function and orientation, creating risks during the aircraft's operation.

In the same way, in the rotor aviation world and in the field of aerospace medicine, its been given special interest to the study of the vibrations of the helicopter and the effects these cause on the body of the pilots. Aerospace medicine focus their efforts in raising awareness to the pilots of the importance of maintaining a good posture during flight and in maintaining daily updated data bases of the crew that suffer ailments caused by the vibrations. Whilst, in another level, of design and development of technology, the efforts have been focused to measures that seek to minimize to the maximum the vibrations produced by the yoke of the engine and aircraft designs have been reformed to provide more pleasant flights.

According to the Colegio Oficial de Pilotos de la Aviación Comercial (COPAC) (Official School of Commercial Aviation Pilots), an investigation of the Austrian Army centred mainly on the helicopter chairs, taking into account the parameters of the International Organization for Standardization, ISO 2631, guide for the evaluation of human exposure to whole-body vibration. It was verified, for example, that the model Bell 212, very usual in coastal zones, vibrations in the floor under the chair reach 12 Hz flying at 100 knots.

When performing the analysis of the aircraft in real flight and of the transducers on the chair's panel, it was observed that the chair increased the vibration amplitude peak, meaning, the chair has a clear negative effect on the pilot occupying it. To correct it, the Austrian Army reduced the maximum flight velocity of the Bell 212 to 90 knots. For each helicopter, the vibration frequencies of the pilot's chair are different and are related with the number of blades of the rotor, for example, the estimated value for a bi-blade helicopter such as the UH-1H, is of 12 Hz.

On a study published on the magazine Aviator, the Danish Acoustic Institute performed in September 1986 a study on the physiological effects of the professional exposure to whole-body vibrations, with 10 pilots of Bell 212 and AS332 Super Puma which are medium sized helicopters of features nearly comparable with the UH-1H; in flights which daily duration is between 3 and 6 hours, gave as result that the helicopter's vibration, measured with a load filter according to ISO 2631, is very near to a pure sinusoidal exposure with the spin frequency of the blades, in the case of the Bell 212 this is 11 Hz, which produce bodily discomfort in the pilots".

Likewise, in an inspection performed among 802 pilots of the US Navy, 72.8% experienced one or more episodes of back discomfort while flying helicopters. According to the obtained data in the previously mentioned studies, vibrations produce a great variety of symptoms, since the data shows it should exist a minimal exposure to the flight duration before back pain is experienced. As a result, its determined that there exist two fundamental factors to take into account when developing the design of the new aircraft chairs and that these two factors are directly involved in the majority of the cases of back pain in helicopter pilots, which are the pilot's posture in flight and the exposure to the vibrations transmitted by the chair, the cyclic and the pedals.

Therefore, its made necessary to count with a device or system that allows to reduce the vibrations that are generated by the main rotor and the tail's rotor of a helicopter, without the need of modifying any of these two main components of the aircraft.

In this sense, in the state of the technique, there exist various types of vibration reduction systems to install in the helicopter's pilot chair. One of these is found in document EP 1392987, which refers to a shock absorber device to reduce the vibration in helicopters and that comprise a device that converts mechanical energy in electrical energy. This is mounted on a base plate joined to the aircraft's structure and its damping effects is based in the use of a suspended magnetic circuit in at least one spring, where all the device is installed in the main rotor of the helicopter.

One of the main disadvantages that are presented with the application of the invention described in the previous document is that the vibration reduction system is installed in the external part of the aircraft, specifically in the main rotor, which makes such device to have elevated installation and maintenance costs. Also, the risk is taken that it affects the behaviour of the blades given that it is made necessary the inclusion of an external device to the aircraft.

On the other part, the document EP 1659309 reports a damping apparatus to reduce the vibrations that are produced by the movement of the rotors in a helicopter, where such apparatus includes a piston that moves a hydraulic fluid inside a damping chamber, which resists the movement of the piston by means of the pressure of such fluid, which supplies damping forces that act to oppose to the movement of the piston reducing or cancelling the vibrations produced by the aircraft's rotors.

The main disadvantage presented by the described invention in the mentioned document is based in the complexity of the shock-absorbing system, given that it is made necessary the inclusion of a hydraulic fluid which use is not advisable for a helicopter, given that the chamber that contains such fluid can suffer blows that can crack it letting the fluid out and provoking problems in the helicopter's rotor.

Considering the previous information it is evident that it existed in the state of the technique the need to design and implement a device to reduce the vibrations produced by the rotors of a helicopter and that are transmitted directly to the pilot by means of his chair, where such device doesn't interfere with the flight mechanisms, that doesn't affect the pilots comfort, that is of easy installation and maintenance and that is also inexpensive, portable, and that can be installed in any type of helicopter and for any pilot, regardless of his weight and physical constitution.

DESCRIPTION OF THE FIGURES

The invention can be understood in a better way by means of the figures, where there are shown each one of the elements that compose the vibration reduction system in the chair of helicopter pilots that is desired to protect. Also, the figures show the reference numbers assigned to each one of the elements that make up such system.

FIG. 8b corresponds to a front view of the support structure of FIG. 8a.

DETAILED DESCRIPTION OF THE INVENTION

The vibrations reduction device of the present invention has as objective to isolate the helicopter's pilot chair from the floor of such aircraft, with the purpose that the rails on which the chair displaces stop behaving as if they were part of the helicopter's floor. When lifting the chair from the floor, it becomes necessary a re-design of such rails so these allow the adaptation of a damping mechanism that doesn't limit the horizontal movement of the chair and that doesn't interfere with the aircraft's command mechanisms, specially with the collective, which is found very near to the base structure of the chair.

The vibrations reduction device in the chair of helicopter pilots comprise the following elements or parts:

A pneumatic bellows (1) located under the helicopter's chair structure, which acts as a damping system for the chair elevating it above the aircraft's floor, with the purpose of counteracting the vibrations generated by the helicopter's rotors.

A check valve (2), that secures that the bellows' air (1) does not return, guaranteeing that its pressure is maintained and the helicopter's vibrations are annulled and are not transmitted to the pilot's chair.

A solenoid valve (3).

A pressure-regulating valve (4).

A pump or compressor (5) to supply air to the bellows (1) through the check valve (2) and the pressure-regulating valve (4). This pump or compressor (5) is controlled by means of a pressure-regulating valve (4) with the purpose of supplying to the bellows (1) enough quantity of air to lift the chair depending on the pilot's weight and physical constitution.

An adaptation mechanism to the chair (6) that allows that the vibrations reduction device can be installed in the bottom part of the pilot's chair, specifically with the chair coupled to the rails (602).

A security mechanism (7) and floor anchorage, that isolates the chair so it doesn't rest directly on the aircraft's floor in case of a sudden loss of air pressure in the bellows (1), which avoids the blow due to such loss in pressure to go directly to the pilot's spine through the chair.

In one mode of the invention, the vibrations reduction device has a maximum height of 10 cm, given that this is the distance from the cabin's floor to the minimum height of the chair. The device also has to uphold a minimal force of 1583.77 N, which is equivalent to the force exerted by the weight of the pilot and the chair.

The vibrations reduction device works with pressures not greater than 0.8 MPa, which is the maximum pressure resisted by the bellows (1). To carry out the connections between the bellows (1) and the check valve (2), it becomes necessary the use of polyurethane hoses for pneumatic connections that resist up to 1.2 MPa of pressure. These hoses have different external diameter calibres and are made with very light synthetic materials and must be flexible to allow the formation of curves that don't affect the air's flow, thus easing the installation inside the aircraft. To achieve these conditions it is worked with a pipe external diameter between 4 and 8 mm, preferably, 6 mm, which is the diameter of the access tube to the bellows (1).

The pneumatic bellows (1) is a simple round damping mechanism which size varies according to the necessary specifications of the system to damp. This type of bellows (1) has a weight between 800 and 1000 g, preferably 900 g and counts with two fixing surfaces, an upper (101) and a lower (102) one manufactured preferably in zinc coated steel and an air entrance (103) to which the check valve (2) is connected, which avoids that the fluid directs on the opposite direction, ensuring that the pneumatic bellows (1) doesn't have air losses due to the applied force.

Preferably, the valve (2) is an unlockable check valve (2) that leaves open the possibility of suppressing the blockage through a piloting, guaranteeing that the device can graduate to the conditions of each pilot. These valves usually work with pipes of 8 mm in diameter, which would demand a fast fitting of ¼, for the valve to adapt to the desired pipe.

The check valve (2) normally has flow in its entrance to allow the access of air to the bellows (1), but in the moment of liberating the pressure of it with the purpose of graduating the system to a lesser pressure, it must have flow solely for the release. This makes necessary the use of pilot solenoid acted valves (3), with return by the action of a spring, 3/2 usually closed, which meets the function of the pneumatic command over the check valve (2).

For the air flow control through the system, solenoid valves or mechanical drive valves (3) can be used, which generate greater reliability and allow a subsequent automation for other desired types of applications in the aircraft. These solenoid valves (3) can be fed with 24V, which is the voltage managed by the helicopter, the signal they emit inputs the device through a simple actuator and of easy operation. So, it is required to control the air flow direction by the action of the check valve (2) with the purpose of guaranteeing that the bellows system (1) stabilizes to the desired pressure.

Figure 1:
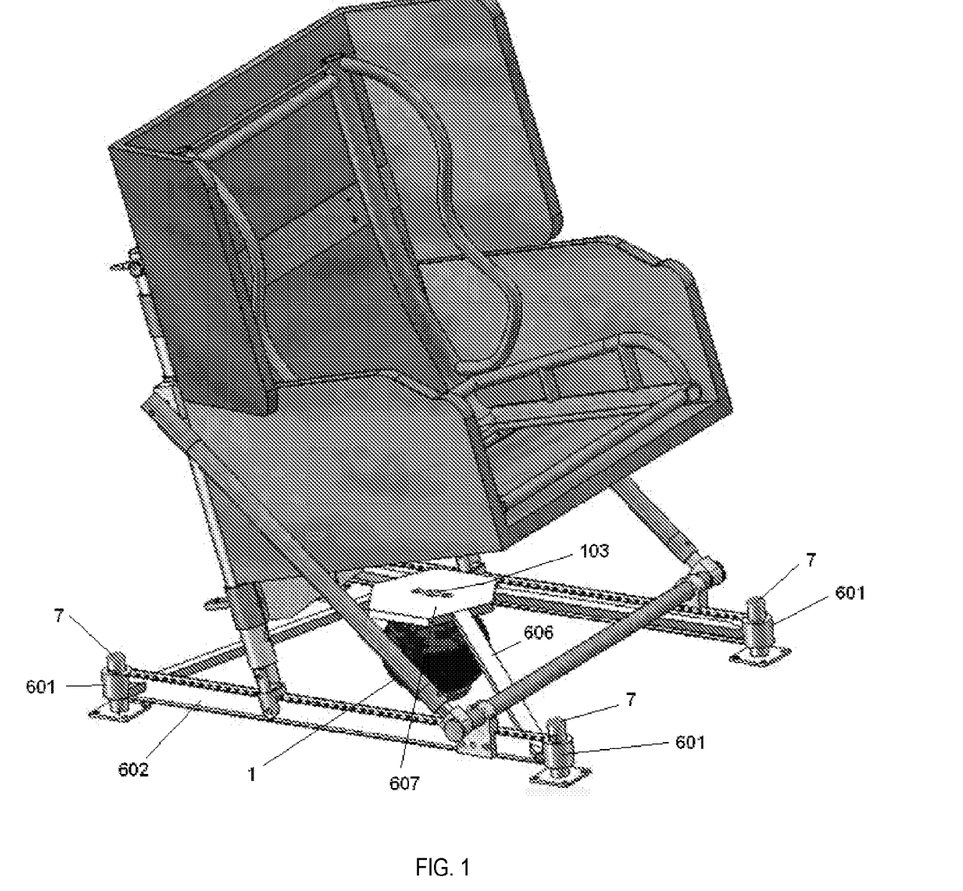
FIG. 1 corresponds to a general view of the vibrations reduction device of the present invention coupled to the aircraft's chair support.
Figure 2:
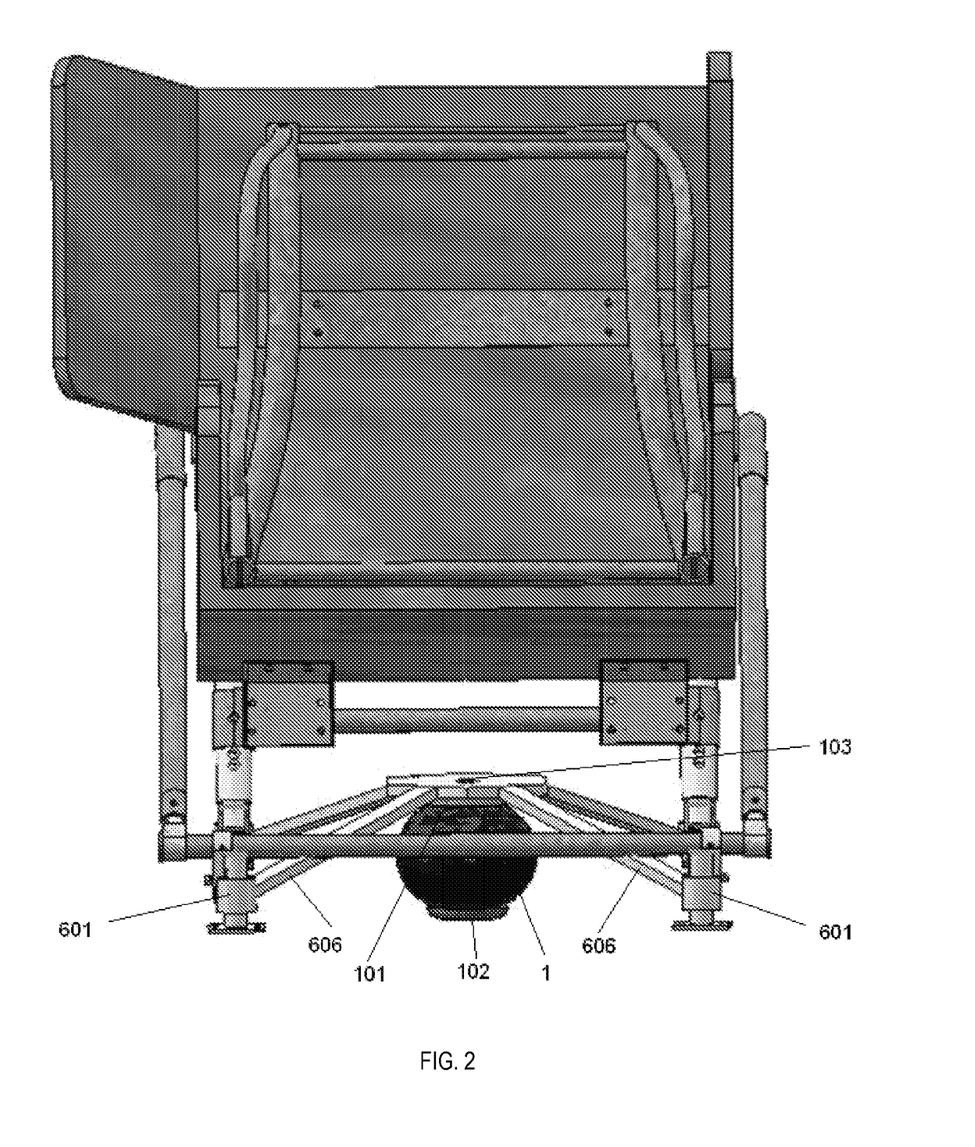
FIG. 2 corresponds to a general frontal view of the vibrations reduction device of the present invention coupled to the aircraft's chair support.
Figure 3:
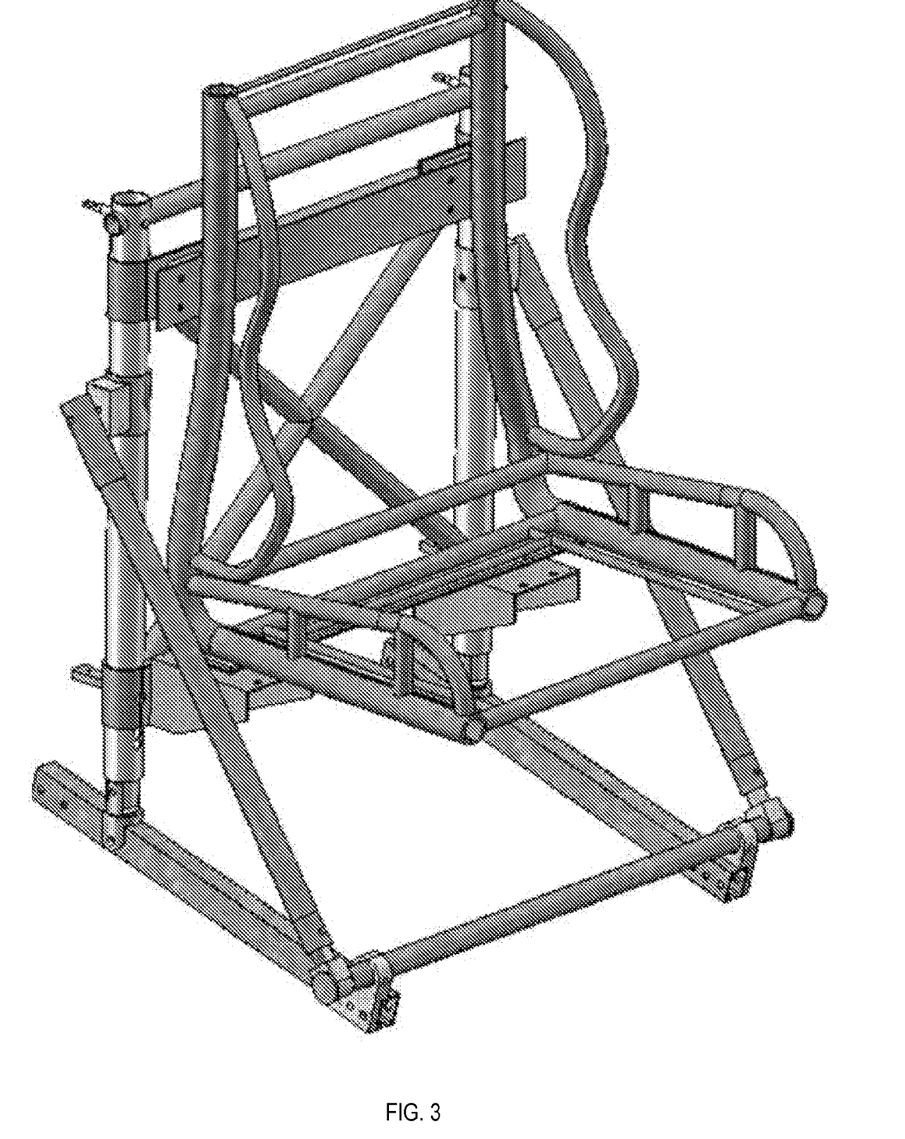
FIG. 3 corresponds to a general view of the pilot's chair without the vibrations reduction device.
Figure 4:
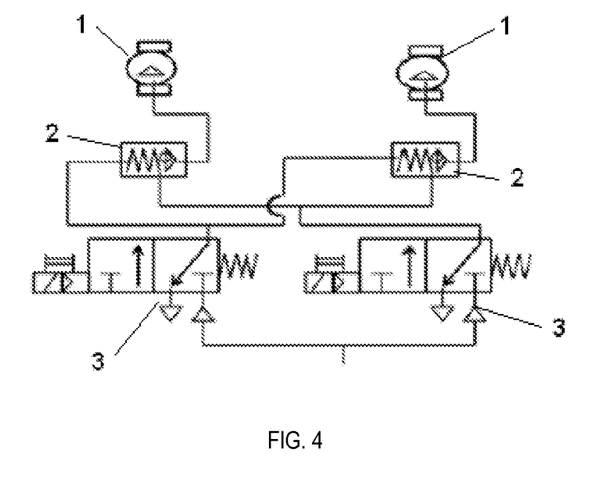
FIG. 4 corresponds to the pneumatic blueprint of the vibrations reduction device.
Figure 5:
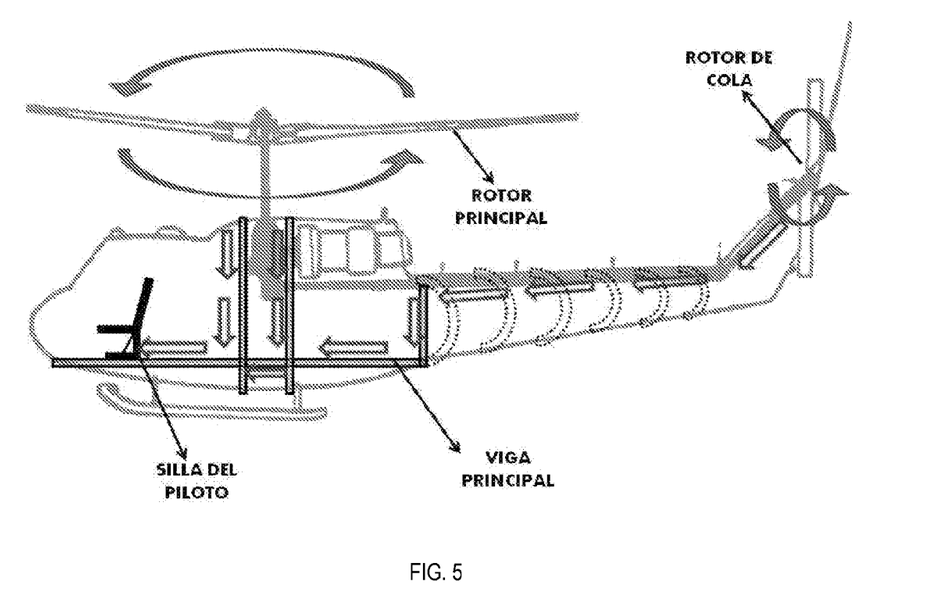
FIG. 5 corresponds to a general scheme of the helicopter, the transmission rotor's configuration and the vibrations to the pilot's chair.
Figure 6:
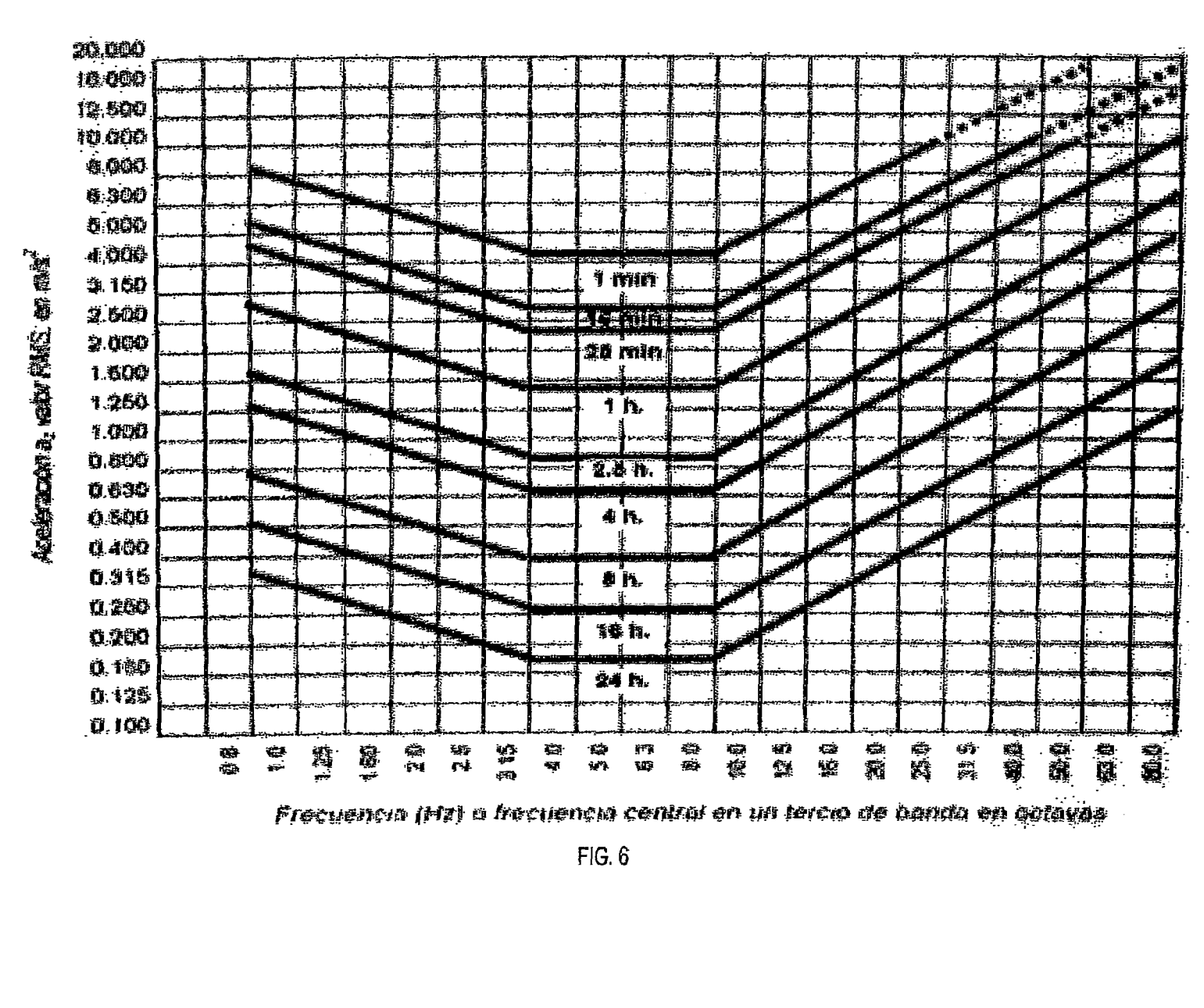
FIG. 6 corresponds to a recommendation graph of the maximum time to which a pilot can be exposed according to standard ISO 2631-1978.

FIG. 4 shows how the valves (3) interact with the valve (2) and the bellows (1). As it can be observed, each one of the solenoid valves (3) controls the air inputs to the bellows (1) and are installed in such way that a valve (3) controls the release and the other controls the feed. When activating the feed solenoid valve (3) it is allowed the air to reach the check valve (2), but not up to its release, which makes the bellows (1) to reach equilibrium at the desired pressure achieving the stability of the system. When performing the flight, the system doesn't interfere with any of the command controls of the aircraft and its installation is simple. In front of the need of graduating again the bellows (1) to a lesser pressure, only valve (3) activates which controls the check valve (2) release, with which air is liberated from the bellows (1) to the atmosphere.

The system is fed through a pump or compressor (5), which is portable and handles pressures up to 2.07 MPa. To achieve the stability of the pneumatic systems it is normally used an accumulator, that is incorporated in the compressor, which is in charge of compensating the pressure oscillations and serves as deposit to which its appealed to cover the compressed air consumption peaks, which makes them adequate when availability of enough compressed air is required as to feed the actuators that work executing fast cycles, such as the bellows (1) that are going to be used in the damping system.

When the bellows (1) are working at 0.8 MPa of pressure, which is the maximum allowed pressure for their operation, they have a maximum volume of 0.8 L, so it is preferred the use of a 5 L accumulator to supply the system without the need to use the compressor (5), with which autonomy is achieved when the compressor (5) fails.

On the other part, the air flow that inputs the bellows (1) must be controlled by an electrical pressure regulating valve (4), so that it is achieved the air flow increase or decrease towards the bellows (1) according to the requirements. The vibrations reduction device has a mechanism that allows graduating the air input pressure to the valves, which can be seen with a manometer.

Figure 8A:
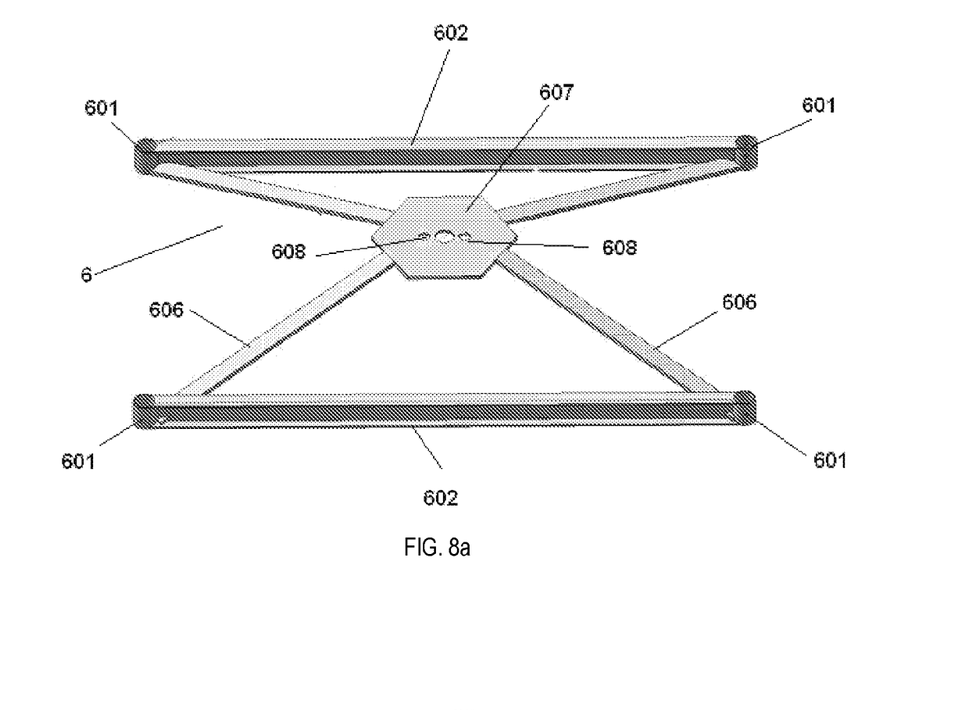
FIG. 8a corresponds to a top view of the support structure from the bellows to the helicopter's chair.
Figure 8B:
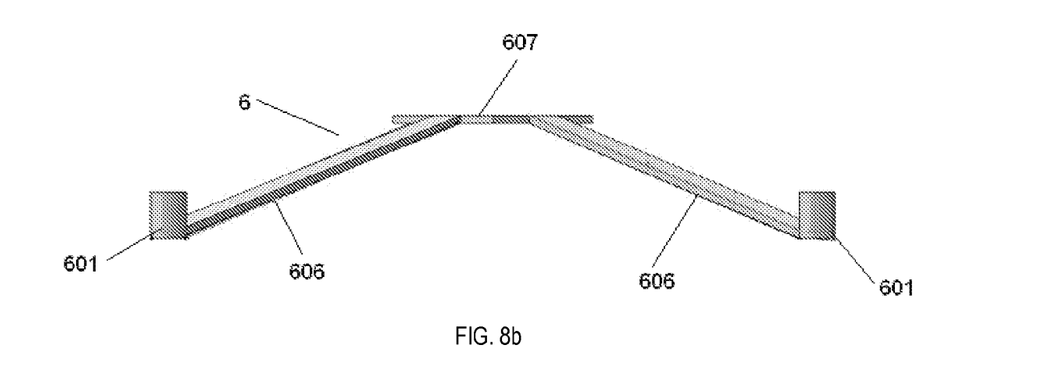
Figure 10:
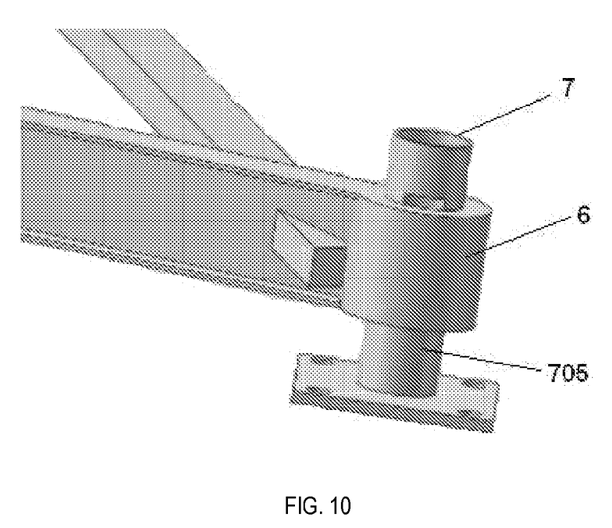
FIG. 10 corresponds to a detailed view of the security mechanism and anchorage and the support structure from the bellows to the chair when such mechanism hasn't been activated.

With the purpose of guaranteeing the functioning of the pneumatic damping system, the implementation of the bellows (1) in the pilot's chair demands a modification of the rails that support it, which is achieved through an adaptation mechanism to the chair (6). Such adaptation mechanism (6) is shown in FIGS. 8a and 8b and counts with four round cylinders (601) as guide that have a height between 2.5 and 3.5 cm, preferably 2.9 cm. These cylinders are manufactured in the same material as the chair and are directly connected in the rails (602) that support the pilot's chair, ensuring its movement in the horizontal axis. These cylinders (601) allow the free movement of the chair over the security mechanism and anchorage (7), as it is observed in FIG. 10, in the vertical axis, but limit the movement in any of the other axes and count with an accidents lock (7) that guarantees the stability of the chair in case of a possible collision. The rails (602) are maintained stable thanks to a structure formed by four cylinders (601), joined to four rods (606) located forming an X and joined through a central platform (607) to which the bellows (1) is connected through two perforations (608) that work with bolts and likewise don't interfere with the check valves (2) connection. Like this, the bellows (1) is located just in the middle of the vertices that dominate the rails and when its found in its maximum expansion, separates the chair form the floor approximately 1.8 cm.

The structure in form of an X is built with defined inclination angles in such way that when the bellows (1) is found in its maximum expansion position, the chair elevates from the floor an approximate height of 1 cm. This elevation allows maintaining the chair detached from the floor as long as possible, which reduces vibrations in a notorious way.

The cylinders (601) have to allow at maximum the vertical movement of the chair, which will be controlled later with the bellows (1) but must ensure that when the aircraft do yaws or varies its gravity centre, the cylinders (601) don't lock with the guides, avoiding the vertical displacement. With the purpose of guaranteeing this movement, a system is implanted as a flexible hub, which is composed of two cylinders, an inner (603) and an outer (604) one of the same length but different diameters, located on a concentric way and with their ends coinciding. These cylinders (603, 604) are joined each through a third elastic rubber cylinder (605), which allows the inner cylinder (603) to have slight degrees of movement in the three axes, avoiding in this way that the system gets locked with the guides.

The outer cylinder (604) contains in its inside an elastomer cylinder (605) which allows a slight deformation in any of the directions. From these cylinders that conform the cylinder (601), the structure that accommodates the bellows is attached, which is composed of four aluminium rods (606) located in an X form, which are shown in FIGS. 8a and 8b.

As the pressure of the bellows (1) decreases, its relative height also does and this causes the rail to slightly approach the floor until it reaches its minimum height, which is found between 4 and 6 cm, preferably 5 cm. When reaching this height the security mechanism (7) is activated, which is in charge of fixing again the chair to the floor of the aircraft when the level of minimum height is reached.

The security mechanism (7) is basically composed of four parts which are: a rail's guide cylinder (705), which stores on its inside the rest of the elements, the lock's support cylinder (706), which maintains the pin (701) in its position ensuring that it triggers if the situation requires it, the pin (701) and the lid of the guide cylinder (703). The rail's guide cylinder (705) is manufactured in the same material that the rails and is in charge that the chair doesn't suffer great longitudinal displacements. This guide cylinder (705) is attached to the floor of the aircraft's cabin through four bolts that fix all the structure to the helicopter.

Figure 7:
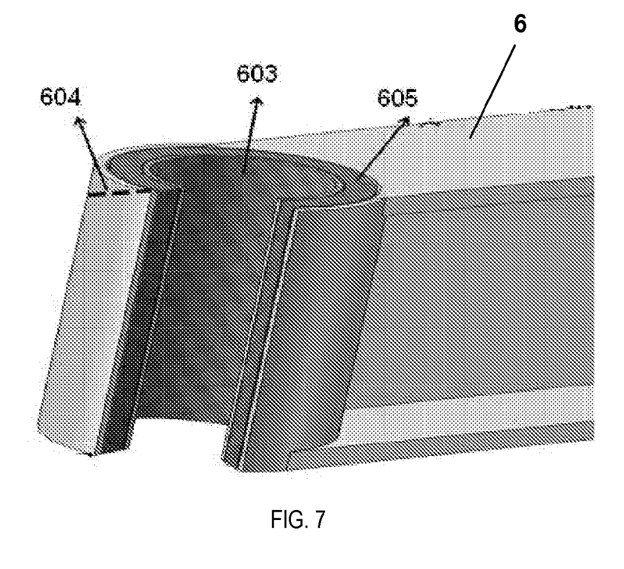
FIG. 7 corresponds to a detailed view of the invention device's concentric cylinders of the adaptation mechanism to the chair.

Inside the guide cylinder (705) must be put the cylinder (706) which main is maintaining the pin (701) in the indicated position for its correct performance, for this reason it must have a height between 35 and 40 mm, preferably 38 mm. When inserting the pin (701) to the inside of the guide cylinder (705), this coincides perfectly by the opening (704) of the pin's (701) exit. The lock is divided in two parts, the pin (701) and its housing (703), which also corresponds to the lid of the cylinders (705, 706). The housing (703) can be observed in FIG. 7 and is in charge of ensuring that the pin (701) is found always ready to trigger and of limiting its movement only in one direction. The housing (703) on its rear has a small vertical wall, which serves as support point for the platelet that holds the pin (701), so it is ensured that the spring (702) that it has, works as a compression helical spring with a static charge. This wall allows that the spring (702) has a maximum race between 12 and 18 mm, preferably 15 mm, which is equivalent to when the lock is activated by drawing out the pin (701).

Figure 9:
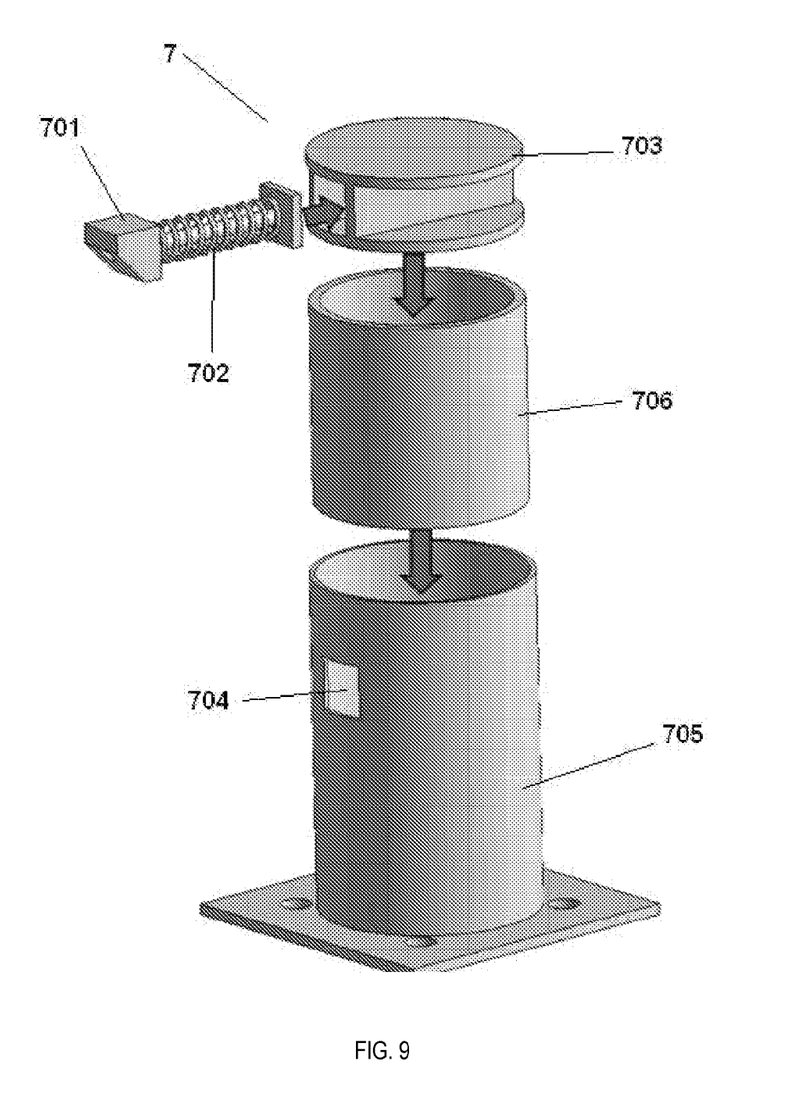
FIG. 9 corresponds to a general view of the inventions device security mechanism and anchorage to fix the chair to the floor of the aircraft.
Figure 11:
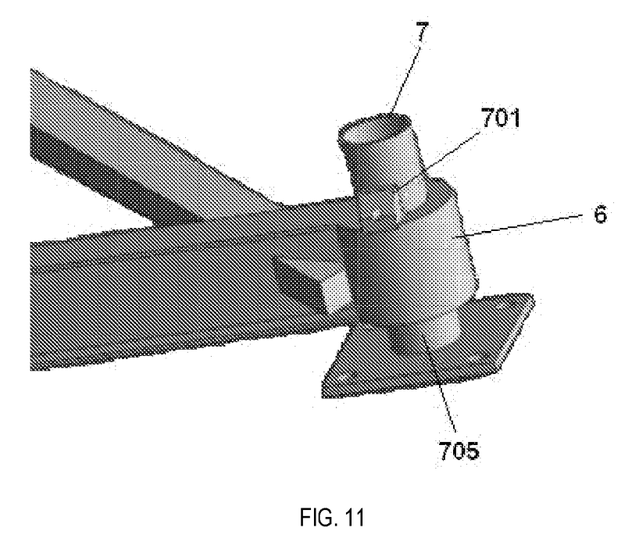
FIG. 11 corresponds to a detailed view of the security mechanism and anchorage and the support structure from the bellows to the chair when such mechanism has been activated.

The security mechanism (7) consists of a simple mechanism based on a pin (701) and a spring (702) as the one used on the doors plates, which is located inside each one of the rail's guide cylinders (705, 706) of the structure of the pilot's chair. The installation of this mechanism can be observed in FIGS. 9, 10 and 11, where it can be observed that the security mechanism (7) guarantees that when the rails (602) lower up to a critical height, inferior to the level where the pin (701) is found, this projects through the whole or opening (704) and shoots blocking the vertical movement of the cylinder (601) and with it the vertical movement of the chair. The security mechanism (7) can be activated again, manually retracting the pin (701) towards the inside of the guide cylinders (705, 706), with which the cylinder (601) is liberated to displace over the rail (705).

Figure 12:
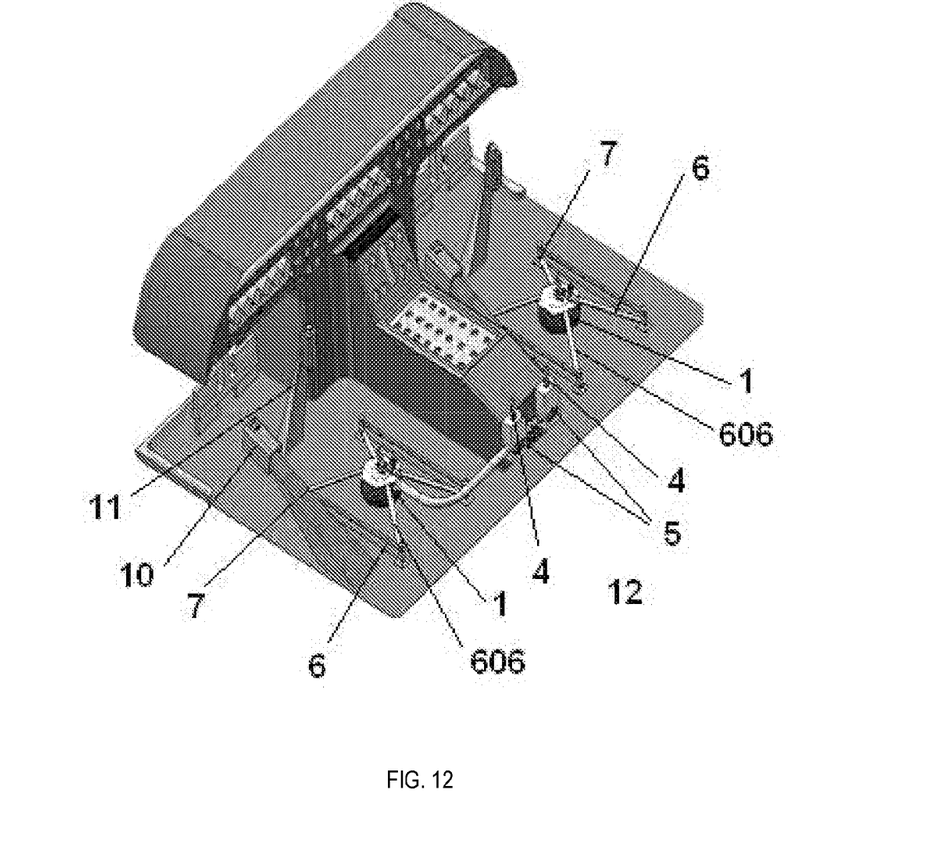
FIG. 12 corresponds to a perspective rear view of the aircraft's cabin with the implemented vibrations reduction device without the pilot and co-pilot's chairs.
Figure 13:
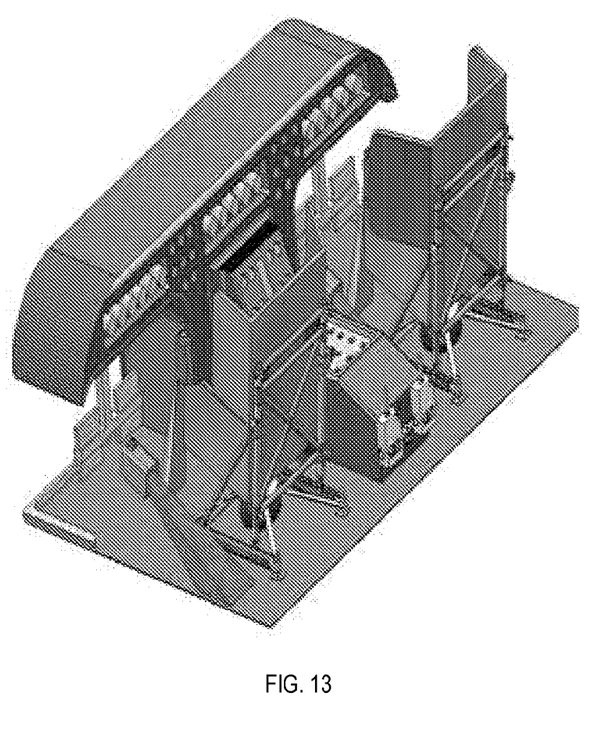
FIG. 13 corresponds to a perspective rear view of the aircraft's cabin with the vibrations reduction device including the pilot and co-pilot's chairs.

In FIGS. 12 and 13 it is shown the final installation of all the vibrations reduction device components located under the chairs of pilot and co-pilot, making the distribution of the elements in such manner that they don't interfere with the fixed parts of the aircraft as are the cyclic (11), the collective (12) and the instruments panel (13). Through these figures of the vibrations reduction device installation in specific points of the aircraft it is proved the simplicity of its assembly, the few space required, in comparison with the existing systems in the state of the technique and the reduced weight that this device provides to the total weight of the aircraft.

In an alternative of the invention, the bellows (1) can be filled of a fluid different from air, which can be another gas or a liquid substance.

The invention claimed is:

1. A vibrations reduction device for a pilot chair in a helicopter, the helicopter having a floor and two rails on the floor that support the pilot chair, comprising:
   a pneumatic bellows located under the pilot chair, the pneumatic bellows elevating the pilot chair above the helicopter floor;
   a check valve for maintaining pressure in the pneumatic bellows;
   a solenoid valve for controlling the direction of fluid in the check valve;
   a pump for supplying air to the pneumatic bellows;
   a pressure regulating valve for controlling air supplied by the pump; and
   an adaptation mechanism to couple the vibrations reduction device to the pilot chair, the adaptation device comprising four round cylinders, four rods, and a central platform, the central platform comprising a plurality of perforations for affixing the pneumatic bellows thereto;
   wherein the four round cylinders are connected to the two rails;
   wherein each of the four round cylinders is joined to a different one of the four rods, the four rods forming an X through the central platform; and
   wherein each one of four security mechanisms is coupled to the adaptation mechanism and anchored to the helicopter floor, the four security mechanisms preventing the pilot chair from contacting the helicopter floor in the event of a sudden loss of air pressure in the pneumatic bellows.

2. The vibrations reduction device of claim 1, wherein the pneumatic bellows comprises a round damping system of variable size, an upper fixing surface, a lower fixing surface, and an air input connected to the check valve.

3. The vibrations reduction device of claim 1, wherein each of the four round cylinders of the adaptation mechanism comprises a flexible hub system further comprising an inner cylinder, an outer cylinder, and a middle cylinder; the inner cylinder and the outer cylinder having the same length and different diameters; wherein the inner cylinder and outer cylinder are disposed concentrically; wherein the ends, respectively, of the inner cylinder and the outer cylinder, coincide; and wherein the middle cylinder comprises an elastic rubber and is disposed between the inner cylinder and the outer cylinder; the middle cylinder allowing three-dimensional movement of the inner cylinder.

4. The vibrations reduction device of claim 1, wherein each of the four security mechanisms comprises a guide cylinder, a support cylinder, a pin, a spring, a lid and an opening; wherein said pin and said spring are disposed inside the guide cylinder and the support cylinder.

5. The vibrations reduction device of claim 4, wherein each of the support cylinders is disposed inside a different one of the guide cylinders, each of the support cylinders maintaining the pin in the required position to allow for the pin's passing through the opening in the event of an air pressure loss in the pneumatic bellows.

6. The vibrations reduction device of claim 5, wherein each of the guide cylinders comprises the same material as the two rails and is secured to the floor of the helicopter with bolts.

7. The vibrations reduction device of claim 6, wherein each of the four round cylinders comprises a height between 2.5 and 3.5 cm and is coupled to one of the guide cylinders to prevent expansion of the spring through the opening.

8. The vibrations reduction device of claim 1, wherein the pneumatic bellows is connected to the check valve with a plurality of hoses, each of the plurality of hoses having a diameter of 4 mm to 8 mm and being capable of resisting up to 1.2 MPa of pressure.

9. The vibrations reduction device of claim 1, wherein the check valve is an unlockable valve.

10. The vibrations reduction device of claim 1, wherein the pump is portable and is capable of managing pressures up to 2.07 MPa.

11. The vibrations reduction device of claim 1, wherein the vibrations reduction device has a maximum height of 10 cm and supports a minimum force of 1583.77 N.

12. The vibrations reduction device of claim 1, wherein the pump is a compressor.

* * * * *